United States Patent [19]

Akae et al.

[11] 4,147,504

[45] Apr. 3, 1979

[54] APPARATUS FOR REGENERATING ACTIVATED CARBON

[75] Inventors: Kiyoshi Akae, Kyoto; Masaya Kitada, Nishinomiya; Yoshiyuki Uno, Ibaraki, all of Japan

[73] Assignee: Unitika Limited, Amagasaki, Japan

[21] Appl. No.: 768,969

[22] Filed: Feb. 16, 1977

Related U.S. Application Data

[62] Division of Ser. No. 585,458, Jun. 10, 1975, Pat. No. 4,030,876.

[30] Foreign Application Priority Data

Jun. 12, 1974 [JP] Japan ................... 49-67410
Jan. 23, 1975 [JP] Japan ................... 50-11118

[51] Int. Cl.² ............................................ F27B 15/10
[52] U.S. Cl. ..................................... 432/101; 432/96; 432/99; 252/411 R; 252/418
[58] Field of Search ................. 432/14, 17, 18, 58, 432/92, 93–102; 252/411 R, 418; 34/171, 167, 168; 110/28 F

[56] References Cited

U.S. PATENT DOCUMENTS

| 685,336 | 10/1901 | Leroy et al. ................. 432/102 |
| 2,177,404 | 10/1939 | Golden ........................ 432/102 |
| 2,518,490 | 8/1950 | Parry ............................ 432/95 |
| 2,833,230 | 5/1958 | Krug ......................... 110/28 F |
| 2,948,521 | 8/1960 | Heiligenstaedt ............... 432/99 |
| 3,601,377 | 8/1971 | Jope ............................. 432/18 |
| 4,007,014 | 2/1977 | Matsumoto et al. ............ 34/171 |
| 4,008,994 | 2/1977 | Numasaki et al. ............. 432/99 |
| 4,052,266 | 10/1977 | Griffth ..................... 110/28 F |

FOREIGN PATENT DOCUMENTS

| 1474442 | 3/1967 | France ........................ 432/98 |
| 1210871 | 1/1968 | United Kingdom ............ 432/99 |

*Primary Examiner*—Henry C. Yuen
*Attorney, Agent, or Firm*—Joseph W. Farley

[57] ABSTRACT

The regenerating apparatus or furnace has gas burners mounted thereon to deliver combustion gas tangentially to a header and thence to distributing ports arranged circumferentially around and internally of a columnar bed of carbon being regenerated to provide uniform temperature distribution across the bed. In an alternate construction, the columnar bed is annular, headers are provided exteriorly and interiorly of the bed, and distribution ports conduct the combustion gas through the inner and outer walls defining the annular bed.

8 Claims, 8 Drawing Figures

APPARATUS FOR REGENERATING ACTIVATED CARBON

This is a division of application Ser. No. 585,458, filed June 10, 1975, now U.S. Pat. No. 4,030,876.

The present invention relates to a method and an apparatus for regenerating activated carbon by using an activated carbon regenerating or reviving furnace of the vertical shaft type having an activated carbon feed port at the upper end and an activated carbon delivery port at the lower end, wherein the activated carbon charged into said furnace is allowed to move downwardly at a slow speed while a high temperature inert gas from a header installed in said furnace is allowed to diffuse into the activated carbon charged layer for heating and regenerating the same.

DESCRIPTION OF THE PREFERRED METHOD

The outline of the activated carbon regenerating process using an activated carbon regenerating furnace of the vertical column or shaft type will now be described with reference to FIG. 1.

Figure 1:
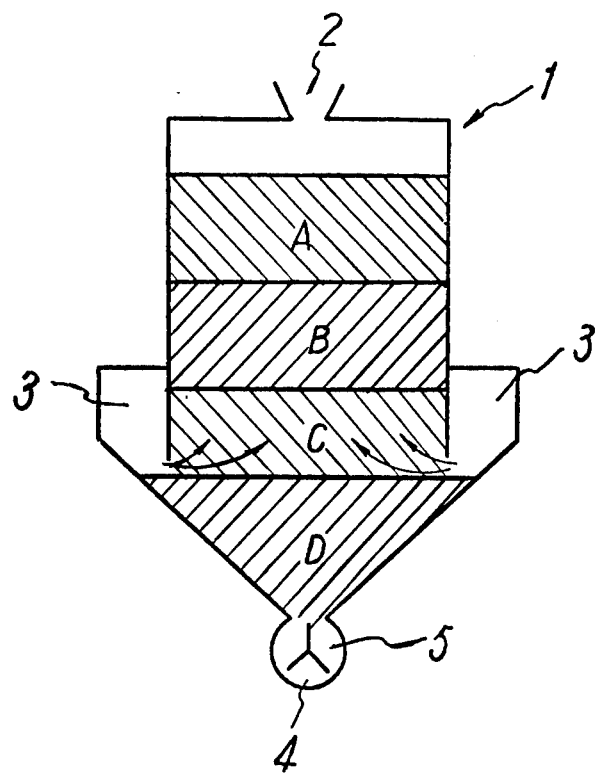
FIG. 1 is a schematic sectional elevation illustrating a vertical column type of regenerating furnace.

Generally, a vertical shaft type activated carbon regenerating or reviving furnace (hereinafter referred to as a furnace for short) indicated at 1 in FIG. 1 is constructed so that activated carbon fed in through an upper feed port 2 forms a charged layer inside the furnace while a combustion gas (high temperature inert gas) from a burner or the like is fed into the furnace so as to be evenly distributed over any horizontal plane of the furnace, establishing uniform contact between the slowly downwardly moving activated carbon and the upwardly moving combustion gas, whereby a regenerating or reviving action is imparted to the activated carbon, the activated carbon thus regenerated being withdrawn through a lower delivery port 4. In this case, it will be seen that the activated carbon for into the furnace moves downwardly successively through a drying treatment zone A, a burning treatment zone B, a reviving treatment zone C and a slow cooling treatment zone D and is then withdrawn.

In this case, in order to ensure uniform regeneration of the activated carbon, it is necessary that the activated carbon charged layer formed inside the furnace be stable. In order to maintain the charged layer in stable condition, it is necessary that the rate of flow of the gas passing through the layer be in the neighborhood of the minimum rate of fluidization of the activated carbon particles. Thus, if the rate of flow of the gas greatly exceeds the minimum rate of fluidization of the activated carbon particles, this would result in the phenomenon of the activated carbon particles being blown up. On the contrary, if the rate of flow of the gas is too slow, a gas channeling phenomenon would occur. It is, therefore, essential to make an arrangement such as to increase the rate of flow of the gas through the layer and ensure uniform gas diffusion to improve its contact with the activated carbon. When such arrangement has been made and the charged layer has been stabilized, the other conditions which affect the results of the regenerating treatment are the water content, bulk density and particle size distribution of the activated carbon itself. If these values vary, the results of the regenerating treatment will greatly vary.

Accordingly, the present invention is intended to specify the water content, bulk density and particle size distribution of activated carbon to be treated as conditions for optimum regenerating treatment when the rate of flow of the gas through the layer and the diffusion of the gas have been maintained in satisfactory condition and the charged layer has been stabilized. Thus, the present invention is characterized by restricting the water content to 50–120%, the bulk density to 0.35 or above and the particle size distribution to 5–40 meshes as conditions for optimum regenerating treatment for various reasons to be later described.

Figure 2:
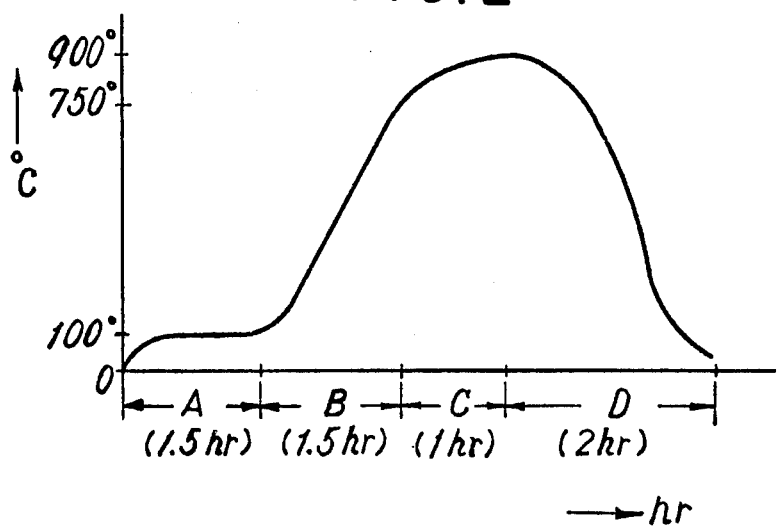
FIG. 2 is graph showing a thermal program for the furnace of FIG. 1.

The thermal program of furnace temperatures in said respective treatment zones and the respective treating periods of time necessary for uniform regeneration of activated carbon using the furnace 1 of said construction are found to be as shown in FIG. 2 considering that the heating limit of activated carbon is about 1,000° C.

FIG. 2 is a graph showing an optimum thermal program obtained with respect to the furnace shown in FIG. 1, in which the treating temperature (° C.) is plotted as ordinate and the treating time (hr) as abscissa. The treating time required is 1.5 hr for the drying treatment zone A and for the burning treatment zone B, respectively, 1 hr for the reviving treatment zone C and 2 hr for the slow cooling zone D. As for the thermal program, it has been experimentally found that an ideal condition is to maintain the drying treatment A at a temperature gradient of about 0° C.–100° C., the burning treatment zone B at a temperature gradient of about 100° C.–750° C., the reviving treatment zone C at a temperature gradient of about 800° C.–900° C. and that in order to carry out such ideal regenerating treatment, the water content of activated carbon to be charged should most suitably be 50–120%.

In other words, in the case of regenerating spheroidal activated carbon used in a gaseous phase, since the water content of said activated carbon is 5–15%, to charge it in that condition into the furnace 1 would result in the charge layer surface temperature (or the drying treatment phase surface temperature) rising to 300°–400° C., in which case if the substance absorbed by the activated carbon is a highly inflammable one such as vinyl acetate monomer, there is the danger of an explosion occuring as it is mixed with oxygen coming in from the upper space of the furnace, or it is often responsible for the deterioration of the activated carbon as a portion thereof adjacent to said surface is oxidized, or for the decrease of the yield. Now, if the activated carbon to be charged is given about 50% of moisture, a portion of the activated carbon layer extending downwardly 100–150 mm from the charge layer surface can be maintained at a temperature gradient of from 50°-60° C. to 100° C., thereby avoiding said disadvantage. This relation may also be said of the regeneration of activated carbon used in a liquid phase. Further, if the moisture content exceeds 120%, more heat of evaporation would be absorbed so that it would be impossible to maintain the burning treatment zone B and regenerating treatment zone C at said optimum temperatures.

The thermal program shown in FIG. 2 has been obtained by restricting the moisture content to 50-120% according to the present invention. In this case, it may be conceived that the amount of combustion gas may be controlled rather than restricting the moisture content of activated carbon. For example, the amount of combustion gas may be decreased when the moisture content of activated carbon is below 50% and increased when it is above 120%. However, decreased amounts cause the furnace temperatures in the burning and regenerating treatment zones B and C to be lowered below the optimum temperatures while increased amounts cause the temperature in the regenerating treatment zone C to be raised above the heating temperature limit of activated carbon, leading to the destruction of activated carbon. It is known in the art that by blowing a gas upwardly against solid particles (such as activated carbon particles), the latter can be fluidized, namely, suspended and maintained in a state of turbulent motion in the stream of gas if the rate of flow of the gas exceeds a certain value, which is referred to as the limit or minimum rate of fluidization of the solid particles. Thus, if the amount of combustion gas is increased, the rate of flow of the gas is increased to greatly exceed the limit of the rate of fluidization of activated carbon particles, so that it is no longer possible to expect the stabilized downflow of the particles. For example, the minimum rate of fluidization of activated carbon whose particle size distribution is about 5-10 meshes is 8-15 cm/sec (in which case the rate of flow of the gas as converted to the superficial velocity in the column is 10-15 cm/sec). If the rate of flow of the gas exceeds this value, the activated carbon particles are blow up. For these reasons, it is most effective to select the moisture content within the range of 50-120% depending upon the kind of the activated carbon as in the present invention. The relation described above may also be said of the bulk density and particle size distribution of activated carbon. In the case of activated carbon having a bulk density of 0.35, the rate of flow of the gas necessary to retain said optimum thermal program can easily greatly exceed said minimum rate of fluidization of activated carbon, causing the blown up phenomenon of activated carbon particles. Further, if the particle size distribution is above 40 meshes, the rate of flow of the gas greatly exceeds the minimum rate of fluidization of activated carbon particles, whereas if it is below 5 meshes, it is impossible to attain uniform and satisfactory contact between the activated carbon particles and the gas. Therefore, for activated carbon whose bulk density is below 0.35 and whose particle size distribution is above 40 meshes, the amount of combustion gas has to be decreased to decrease the rate of flow of the gas, so that the optimum thermal program for the furnace cannot be retained. Further, if the gas temperature is increased while decreasing the rate of flow of the gas, the activated carbon is locally subjected to high heat at above 950° C., suffering damage and causing disadvantages as described above with reference to the moisture content. Therefore, it follows that for activated carbon to be charged into the furnace, it should be conditioned so that the moisture content be 50-120%, the bulk density be 0.35 or above and the particle size distribution be 5-40 meshes.

An example of the regeneration of activated carbon according to the method of the present invention is given below.

The activated carbon treated had absorbed about 30% phenol and given 75% moisture, the bulk density being 0.45, the particle size distribution being 8-40 meshes. The number of revolutions of the rotary valves installed in the lower delivery port 4 of the furnace 1 shown in FIG. 1 was set so that the activated carbon could be treated at the rate of 5 Kg/h. It was charged into the furnace through an upper hopper (not shown) so that the activated carbon charged layer might be maintained at a fixed level. Further, the header 3 had six burners (not shown), and a slightly larger proportion of gas than the theoretical combustion mixing ratio was burned, the resulting combustion gas being blown into the furnace. The superficial gas velocity was 10-11 cm/sec. The temperature attained in the header 3 was 1,000°-1,050° C., and when the gas at about 1,000° C. from the header 3 was blown into the furnace, the atmosphere in the regenerating treatment zone C showed a temperature gradient of 830°-880° C., the atmosphere in the burning treatment zone B showed a temperature gradient of 100°-800° C. and the atmosphere in the drying treatment zone A showed a temperature gradient of 60°-100° C., whereby uniform and satisfactory regeneration of the activated carbon was achieved. In addition, the amount of combustion gas resulted from burning propane gas at the rate of 0.5 Kg/hr, and the rate of flow of the exhaust gas was 10-11 cm/sec (at 800° C.).

As has so far been described in detail, according to the present invention, by controlling activated carbon to be charged into the regenerating furnace so that the moisture content is 50-120%, the bulk density is 0.35 or above and the particle size distribution is 5-10 meshes, it is possible to maintain the thermal program for the furnace at the optimum temperature gradient, thereby carrying out uniform and satisfactory regeneration of the activated carbon. Further, the gas to be used for regeneration has only to be fed into the furnace while retaining a constant amount of combustion gas, rate of flow of the gas (as converted to the superficial velocity in the column), and temperature. Therefore, there is no need to control the combustion of the gas. Further, since there is no need to separately control the temperatures of the atmospheres in the individual treatment zones, the regeneration of activated carbon can be carried out very easily and at low cost. Further, by establishing the conditions for activated carbon to be charged into the furnace as described above, it is possible to prevent the oxidation, explosion, blowing up, and destruction of the activated carbon due to overheating, thereby minimizing the loss of the activated carbon.

What is important in carrying out the method of the present invention is to ensure that the flow of high temperature inert gas through the activated carbon layer in the furnace will be uniform in any horizontal plane throughout said layer. Further, the furnace shown in the FIG. 1 is useful for treatment of small amounts. This type of conventional furnace is provided with a high temperature inert gas producer which is separate from said furnace, the arrangement being such that the high temperature inert gas from said producer is introduced into the furnace through a duct or the like. As a result, the apparatus tends to be of large size, requiring an increased floor space, and is disadvantageous in that the maintenance and inspection thereof are troublesome. Particularly in point of thermal efficiency, the conventional apparatus using a duct suffers a large loss of heat.

For easily and satisfactorily carrying out the above described method, the present invention also provides a moving bed and shaft type activated carbon regenerating or reviving furnace which is so arranged that the difference in the temperature distribution in any horizontal plane in the furnace is kept to about ±10° C. at most to improve contact between the high temperature inert gas and the activated carbon, enabling the regenerating or reviving operation to be carried out uniformly and in a short time and that the high temperature inert gas producer separate from the furnace is eliminated, thereby improving the compactness and thermal efficiency of the apparatus.

DESCRIPTION OF THE PREFERRED APPARATUS

Preferred embodiments of the apparatus of the present invention will now be described with reference to FIGS. 3 through 8 in the accompanying drawings.

Figure 3:
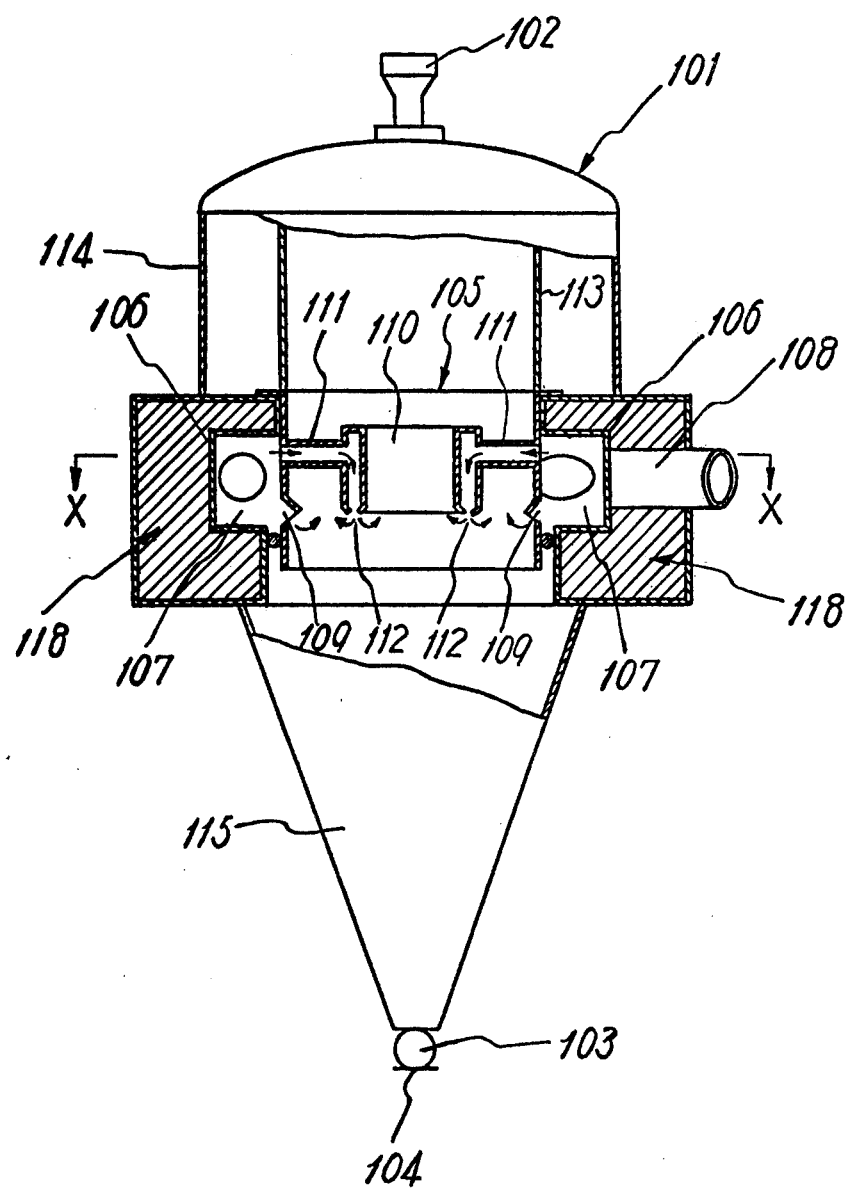
FIG. 3 is an elevation, partly in section, of a regenerating furnace constructed in accordance with the present invention.
Figure 4:
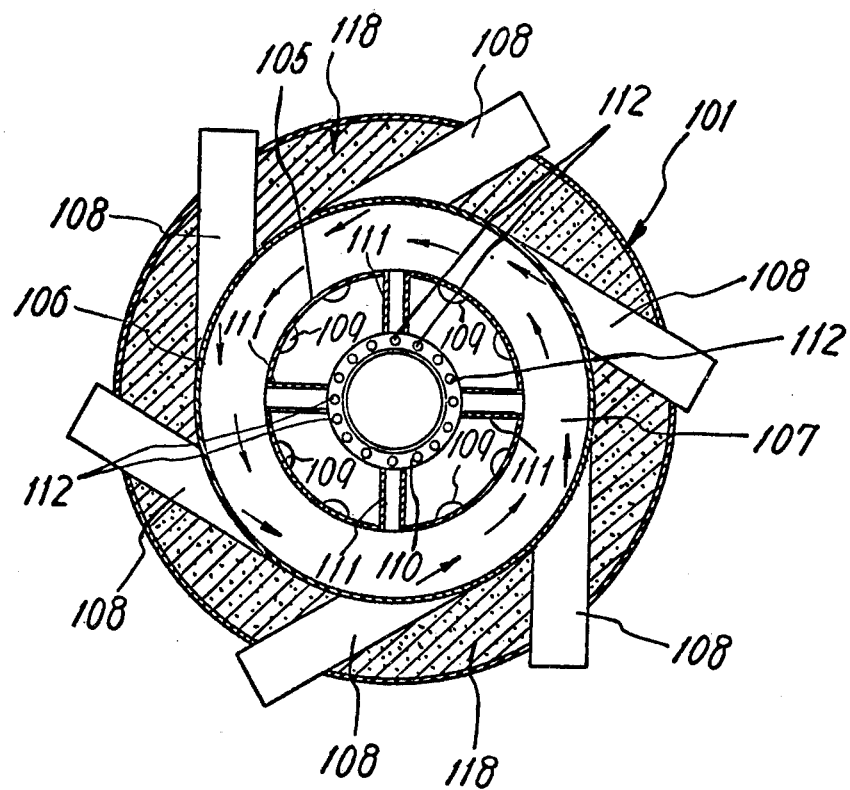
FIG. 4 is a sectional plan view taken as indicated by the line X—X of FIG. 3.

In FIGS. 3 and 4, the reference 101 designates a shaft type regenerating or reviving furnace formed with an activated carbon feed port 102 at the upper end and a rotary valve or other means 103 at the lower end for controlling the amount of activated carbon to be delivered, the arrangement being such that activated carbon fed into the furnace 101 through the feed port 102 is subjected to a regenerating or reviving action to be later described and is then delivered through the delivery port 104. The furnace 101 of this embodiment comprises a cylindrical inner sleeve 105 made of stainless steel and disposed below said feed port 102, an annular header 106 disposed outside said inner sleeve 105 to surround the latter, and an inert gas channel 107 defined internally of said header 106. Installed on the outer peripheral surface of the header 106 and a plurality of gas burners 108 (FIG. 4) disposed at regular intervals circumferentially of said header, said burners being oriented so that the combustion exhaust gases (high temperature inert gases) from the gas burners 107 are tangentially fed into said inert gas channel 107. In addition, the gas burners 108 may, for example, be of the premix type whose rate of combustion is high and whose capacity of combustion is small, and they are constructed so that the fuel gas is burned with an air ratio which corresponds to or is lower than the theoretical air ratio necessary for complete combustion.

The inner sleeve 105 is constructed in the following manner.

The portion of the inner sleeve 105 close to the lower end thereof is provided with a plurality of inert gas blowing nozzles 109 disposed at regular intervals circumferentially of the inner sleeve so that the inert gas (i.e., combustion exhaust gas) orbiting in said inert gas channel 107 is uniformly blown out from the entire circumference thereof into the inner sleeve 105. A hollow ring 110 is substantially coaxially disposed inside the inner sleeve 105 and is supported from the latter by pipes (or ducts) 111. The pipes 111 (in the drawings, there are four) open into the inert gas channel 107 at the lateral side of the inner sleeve 105 and into the ring 110 at the lateral side of the latter. Further, the entire lower end surface of the ring 110 is formed with downwardly directed inert gas blowing apertures 112 disposed at regular intervals circumferentially of the ring. Therefore, the inert gas channel 107 communicates with the inner sleeve 105 through the pipes 111, ring 110 and inert gas blowing apertures 112.

The reference 113 designates a treating sleeve positioned between the feed port 102 and the inner sleeve 105; the reference 114 designates the outer wall of the furnace 101; and the reference 115 designates a chute through which the activated carbon after being regenerated or revived is introduced to the delivery port 104. The sleeves 113 and 105 form columnar means for defining an activated carbon moving bed including the treatment zones A-C of FIG. 1.

In the furnace 101 constructed in the manner described above, activated carbon is fed through the feed port 102 while the fuel gas is burned by the gas burners 108 and the resulting inert gases, i.e., combustion exhaust gases, are fed tangentially into the inert gas channel 107 inside the header 106. Therefore, the inert gases from the individual burners 108 circulate in the inert gas channel 107 and are mixed together by the mixing action attendant on said circulation so that their temperatures are evened out and they are then blow out into the inner sleeve 105 through the nozzles 109 provided on the entire periphery of the inner sleeve with some of the inert gases circulating in the inert gas channel 107 reaching the ring through the pipes 111 and being then likewise blown out into the inner sleeve 105 through the inert gas blowing apertures 112 of the ring 110. Since the high temperature inert gases are blown out from the entire periphery of the inner sleeve through the nozzles 109 and also from the ring 110 in the central region of the bed for activated carbon to be treated defined by the inner sleeve 105, it follows that the inert gases are fed or distributed evenly into the inner sleeve 105. Thus, the temperature distribution in one and the same plane is uniform, and the upward movement of the inert gases in the inner sleeve 105 coupled with the downward movement of the activated carbon ensures uniform contact therebetween. As the activated carbon moves downwardly through the bed defined by the treating sleeve 113 and the inner sleeve 105, it is regenerated by being passed through the drying, burning and reviving stages and reaches the delivery port 104 via the chute 115.

Further, since said gas burners 108 are of the premix type whose rate of combustion is high and whose capacity of combustion is small, as described above, the combustion of the fuel is completed in the burners before it enters the header 106 and only the combustion exhaust gases enter the inert gas channel 107 and circular in the latter. That is, without the need to provide a special combustion chamber otherwise required for complete combustion, it is possible to supply a satisfactory inert gas and to install the gas burners 108 into the furnace 101 as in the above construction.

Figure 5:
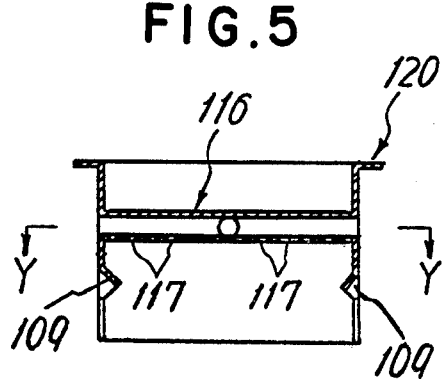
FIG. 5 is a sectional elevation showing a modified form of inner sleeve.
Figure 6:
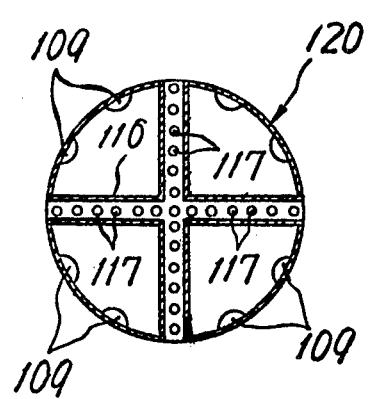
FIG. 6 is a sectional plan view taken as indicated by the line Y—Y of FIG. 5.

FIGS. 5 and 6 illustrate a modified inner sleeve 120 which is equipped with inert gas blowing nozzles 109 around the peripheral surface thereof as in the case of the inner sleeve 105, but which instead of the ring 110 of the inner sleeve 105, internally supports radial pipes 116 assembled crisscross and having a number of inert gas blowing apertures 117 in the lower side thereof. The selection of the inner sleeve 105 or the inner sleeve 120 may be made depending upon the diameter of the inner sleeve, it being found that the inner sleeve 105 is suitable for diameters of 400 mm or above and the inner sleeve 120 for diameters therebelow. In addition, ducts may be used instead of the radial pipes 116. By adjusting the rotary valve 103 in the delivery port 104 shown in FIG. 3, it is possible to control the amount of regenerated activated carbon to be delivered.

Further, indicated at 118 in FIGS. 3 and 4 is refractory brick.

As described in the above embodiment, the shaft type activated carbon regenerating or reviving furnace according to the present invention has burners built therein without using a large-sized inert gas producer which requires a special combustion chamber, thereby achieving compactness of the entire apparatus, the reduction of cost and the simplicity of maintenance and inspection of the apparatus. Particularly, the disposition of gas burners adjacent the inert gas channel offers great improvements in point of thermal efficiency. Further, it will now be understood that inert gas is fed tangentially into the header, and, after its temperature is evened out in the inert gas channel, it is blown out from the entire periphery of the inner sleeve while the inert gas introduced through pipes or ducts is evenly distributed in the interior of the inner sleeve and blown out. Therefore, the supply of the inert gas can be effected substantially evenly throughout the interior of the inner sleeve so that the inert gas evenly passes through the activated carbon layer to even out the activated carbon temperature distribution in one and the same plane while promoting the contact between the inert gas and the activated carbon to shorten the reviving time. Further, the even distribution of the inert gas prevents the local heating of the inner sleeve, thereby greatly prolonging the life of the inner sleeve.

A second embodiment of the apparatus according to the present invention will now be described with reference to FIGS. 7 and 8.

A furnace 201 according to the second embodiment, like the furnace 101 previously described, is formed with an activated carbon feed port 202 at the upper end and a delivery port 204 at the lower end having a rotary valve 203 or other means for controlling the amount of activated carbon to be delivered, the arrangement being such that activated carbon fed into the furnace 201 through the feed port 202 is subjected to a regenerating or reviving action to be later described and is then delivered through the delivery port 204. In this embodiment, the columnar means comprises a double-walled inner sleeve 207 having an inner wall 205 and an outer wall 206 and extending from the feed port 202 to to the delivery port 204 so that the activated carbon fed in through said feed port 202 flows down in an annular space defined between the inner and outer walls 205 and 206 to form an annular activated carbon moving bed 208 in said space. Further, installed externally of the outer wall 206 is an annular outer header 209 surrounding said outer wall 206, while installed internally of the inner wall 205 and between upper and lower refractory materials 210a and 210b is an inner header 211, said two headers 209 and 211 internally defining inert gas channels 212 and 213, respectively. The outer and inner walls 206 and 205 are formed with a plurality of circumferentially regularly spaced apertures 214 and 215, respectively, for establishing communication between the headers 209, 211 and the activated carbon moving bed 208 between the two walls. In addition, the inner sleeve 207 is made of a heat-resisting material such as heat-resisting steel. The reference 216 designates a gas burner installed in an outer refractory material 217 in such a manner that the combustion exhaust gas (high temperature inert gas) from the gas burner is tangentially directed into the inert gas channel 212. Another gas burner 218 is installed in the outer refractory material 217 with the front end thereof extending through an aperture 219 in the inner sleeve 207 so as to open into the interior of the inner header 211 so that the combustion exhaust gases are fed into the inert gas channel 213.

In the furnace 201 constructed in the manner described above, activated carbon is fed through the feed port 202 into the annular space between the inner and outer walls 205 and 206 of the inner sleeve 207 while the fuel gas is burned by the gas burners 216 and 218 and the resulting high temperature inert gases which are the combustion exhaust gases are fed into the respective headers 209 and 211. Therefore, the inert gases from the individual burners circulate in the respective inert gas channels 212 and 213 and are mixed by the mixing action attendant on said circulation so that their temperatures are evened out and they flow into the annular activated carbon moving bed 208 from the inside and outside thereof through the apertures 214 and 215 of the outer and inner walls 206 and 205, respectively.

With the activated carbon bed 208 in the form of a ring and with a construction adapted to feed high temperature inert gas into said bed 208 from the inside and outside thereof, as described above, when it is desired to provide a furnace in which the amount to be treated per unit time is increased by increasing the cross-sectional area of the activated carbon moving bed, this can be achieved by changing the inner and outer diameters of the bed 208 while maintaining the width S of said bed 208 at a value not departing from the range within which the high temperature inert gas fed from the inside and outside can heat said bed 208 uniformly in any horizontal plane thereof. In this manner, it is possible to uniformly feed the high temperature inert gas into the activated carbon moving bed 208 while increasing the amount to be treated per unit time. Thus, the temperature distribution in one and the same plane of said bed 208 is evened out. As the inert gas moves upwardly through the activated carbon moving bed 208 while the activated carbon moves downwardly, uniform contact therebetween is effected. As the activated carbon moves downwardly, it is homogeneously regenerated by being passed through the drying, burning and reviving stages and reaches the delivery port 204.

Figure 7:
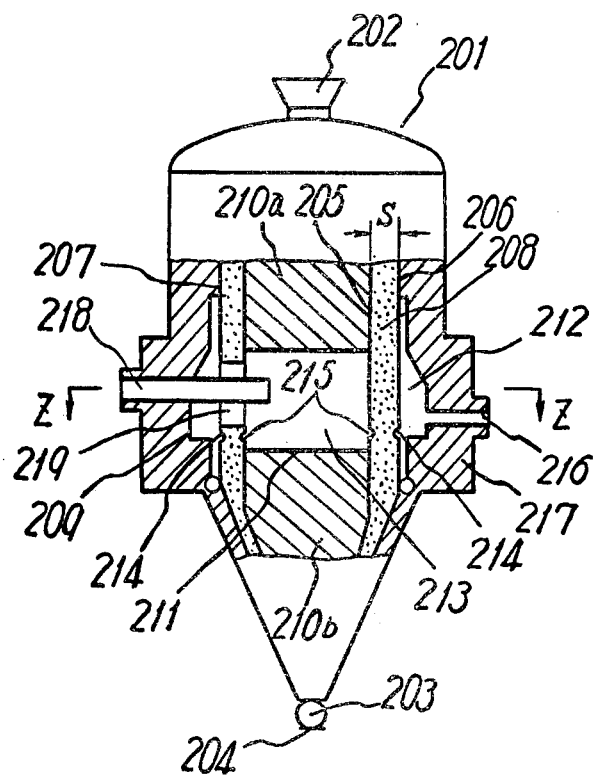
FIG. 7 is an elevational view partly in section, of another embodiment of the furnace of the invention; and, FIG. 8 is a sectional plan view taken in the direction of the arrows Z—Z of FIG. 7.
Figure 8:
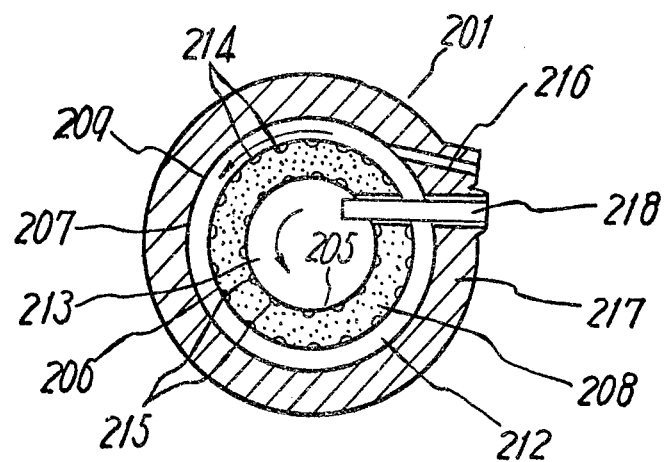

In addition, in FIGS. 7 and 8, the relative position of the gas burners 216 and 218 is shown more or less shifted from the desired tangential relation, for the purpose of facilitating the description and illustration.

We claim:

1. Am activated carbon regenerating or reviving furnace of the shaft type having an upper end provided with a port for feeding activated carbon to be treated and a lower end provided with a port for delivering activated carbon after treatment;

columnar means between said ports for defining an activated carbon moving bed having successive drying, burning and reviving treatment zones extending downwardly from said upper end, said columnar means including at least one sleeve having an imperforate cylindrical wall extending upwardly from said delivery port means;

header means provided around said columnar means in said reviving treatment zone for defining a high temperature inert gas channel;

burner means for tangentially directing combustion exhaust gases to said header means for circulation therein; and high temperature inert gas delivery port means communicating between said header means and said carbon bed for uniformly distributing said high temperature inert gas to said carbon bed for upward movement therein, said gas delivery port means comprising a plurality of ports located substantially in a common horizontal plane.

2. A furnace as set forth in claim 1, wherein said high temperature inert gas delivery port means comprises a plurality of circumferentially disposed delivery ports for supplying said gas to the outer peripheral portion of said activated carbon bed, and a plurality of delivery ports for supplying said gas to the central portion of said activated carbon bed.

3. A furnace as set forth in claim 2, characterized in that said delivery ports for supplying the gas to the central portion of said activated carbon bed are provided at suitable circumferential intervals in a hollow ring concentrically installed in said columnar means, said hollow ring communicating with said header through pipes.

4. A furnace as set forth in claim 2, characterized in that said ports for supplying the gas to the central portion of said activated carbon bed are provided in pipes which are installed so as to extend across said bed and which communicate with said header.

5. A furnace as set forth in claim 4, characterized in that said pipes extend radially from the center of said activated carbon bed.

6. A furnace as set forth in claim 1, characterized in that said columnar means includes inner and outer walls defining annular activated carbon moving bed, said header means includes headers provided inside and outside said inner and outer walls, and said high temperature inert gas delivery port means establishes communication from said headers through said inner and outer walls of said columnar means at suitable circumferential intervals.

7. A furnace as set forth in claim 6 wherein said burner means includes a separate burner for each of said inside and outside headers.

8. A furnace as set forth in claim 6 wherein said inner and outer walls of said columnar means are imperforate above said delivery port means.

* * * * *

UNITED STATES PATENT AND TRADEMARK OFFICE
CERTIFICATE OF CORRECTION

PATENT NO. : 4,147,504
DATED : April 3, 1979
INVENTOR(S) : KIYOSHI AKAE, MASAYA KITADA and YOSHIYUKI UNO It is certified that error appears in the above-identified patent and that said Letters Patent are hereby corrected as shown below:

Column 1, line 57, "for" should read -- fed -- ;

Column 6, line 25, "blow" should read -- blown -- ;

Column 8, line 54, "Am" should read -- An -- ;

Column 10, line 11, after "defining" insert -- said --.

Signed and Sealed this

Thirty-first Day of July 1979

[SEAL]

Attest:

Attesting Officer

LUTRELLE F. PARKER
Acting Commissioner of Patents and Trademarks